US012565035B2

(12) United States Patent
Solomon

(10) Patent No.: US 12,565,035 B2
(45) Date of Patent: Mar. 3, 2026

(54) HEAT PRESS SUITABLE FOR APPLYING A WATER-BASED INK PRINT ON A STACK OF FABRIC LAYERS OF DIFFERENT SIZES

(71) Applicant: Eric Solomon, Houston, TX (US)

(72) Inventor: Eric Solomon, Houston, TX (US)

( * ) Notice: Subject to any disclaimer, the term of this patent is extended or adjusted under 35 U.S.C. 154(b) by 475 days.

(21) Appl. No.: 18/096,976

(22) Filed: Jan. 13, 2023

(65) Prior Publication Data

US 2024/0239095 A1 Jul. 18, 2024

(51) Int. Cl.
*B41F 16/02* (2006.01)
*B41F 1/38* (2006.01)
*B41F 16/00* (2006.01)

(52) U.S. Cl.
CPC ............ *B41F 16/0046* (2013.01); *B41F 1/38* (2013.01); *B41F 16/02* (2013.01)

(58) Field of Classification Search
CPC .... B41F 1/00; B41F 1/38; B41F 16/00; B41F 16/0046; B41F 16/02
See application file for complete search history.

(56) References Cited

U.S. PATENT DOCUMENTS 3,251,297 A * 5/1966 Kees .......................... B65C 9/24
156/DIG. 36
4,911,070 A * 3/1990 Miske ..................... B41F 15/02
101/481
5,009,943 A 4/1991 Stahl
5,167,750 A 12/1992 Myers
5,252,171 A 10/1993 Anderson et al.
5,422,173 A 6/1995 Stahl
5,435,883 A 7/1995 Myers
5,474,633 A 12/1995 Myers
5,584,061 A 12/1996 Kimura et al.
5,769,999 A 6/1998 Anderson et al.
7,581,492 B2 * 9/2009 Roberts, Jr ............. B41F 15/06
101/488
7,963,219 B2 6/2011 Robinson
8,299,387 B2 10/2012 Stahl
9,121,120 B2 9/2015 Ciaramitaro
9,486,995 B2 11/2016 Fiorucci
9,527,337 B2 12/2016 Whitley
10,315,448 B2 6/2019 Stahl
10,493,713 B2 12/2019 Robinson et al.
10,569,530 B2 2/2020 Robinson et al.
10,882,142 B2 1/2021 Ciaramitaro
11,155,116 B2 10/2021 Figueroa
2018/0361730 A1 * 12/2018 Robinson ................ B41F 16/02
2020/0130405 A1 4/2020 Robinson et al.
2020/0384715 A1 12/2020 Galkin et al.
(Continued)

*Primary Examiner* — Nguyen Q. Ha
(74) *Attorney, Agent, or Firm* — Jonathan Pierce; Derek V. Forinash; Porter Hedges LLP

(57) ABSTRACT

A heat press includes a screen printing head and a stamp unit. The stamp unit includes a frame, carriages, a support, and a platen or ironer. A horizontal position of the platen relative to the screen printing head can be adjusted by unlocking carriages from guide rails and sliding the carriages while the frame remains attached to the screen printing head. Also, the platen is coupled to the support so that a horizontal position of the platen relative to the support is fixed, and a vertical position of the platen relative to the support is floating. The heat press is suitable for applying a print on a substrate, such as a stack of fabric layers of different sizes.

12 Claims, 2 Drawing Sheets

(56) References Cited

U.S. PATENT DOCUMENTS

| | | | |
|---|---|---|---|
| 2021/0162799 A1 | 6/2021 | Ciaramitaro et al. | |
| 2021/0252797 A1 | 8/2021 | Galkin et al. | |
| 2024/0336057 A1* | 10/2024 | Huang | B66B 7/024 |

* cited by examiner

HEAT PRESS SUITABLE FOR APPLYING A WATER-BASED INK PRINT ON A STACK OF FABRIC LAYERS OF DIFFERENT SIZES

BACKGROUND

The disclosure relates generally to a heat press suitable for applying a water-based ink print on a substrate, such as a stack of fabric layers of different sizes. This disclosure relates more specifically to a stamp unit configured to be attached to a screen printing head of an inline heat press in which the stamp unit allows the adjustment of the horizontal position of a floating spring-biased platen relative to the horizontal position of a pallet of the screen printing head.

In the garment industry, heat presses are commonly used to imprint a design on a garment, such as on a t-shirt or a sweatshirt. A heat press is used to remove moisture from the garment and the print. For example, after a high-solid acrylic ink foundation is imprinted on the garment, the foundation can be fixed by heat pressing before top colors are applied.

It is preferable that the heat press applies a uniform pressure and temperature to the substrate in various circumstances. For example, U.S. Pat. No. 9,486,995 describes a heat press with a floating spring-biased platen fitting closely inside a rectangular frame that could be attached to a screen printing head. This floating spring-biased platen can accommodate minor variations in garment thickness and apply a more uniform pressure and temperature than a fixed platen.

However, when the thickness variations are caused by a small extra layer of fabric used, for example, for providing a pocket to the garment, the floating spring-biased platen may become less effective than a fixed platen. Indeed, unless the extra layer of fabric is well centered relative to the spring of the floating spring biased platen, some of the springs of the floating spring biased platen will compress significantly more than others, allowing the platen to tilt and causing a pressure relief from a central portion of the extra layer of fabric and a concentration of pressure on a side portion of the extra layer of fabric. Instead, a fixed platen would not tilt and could apply a more uniform pressure and temperature on the extra layer of fabric only. Thus, a fixed platen design could be used to imprint a design on the extra layer of fabric only, provided the extra layer of fabric has a sufficiently uniform thickness. When the extra layer of fabric does not have a sufficiently uniform thickness, such as in the presence of seams, it may become difficult to generate a uniform pressure and temperature suitable for fixing the water-based ink print.

Therefore, there is a need in the art for an improved heat press suitable for applying a print on a substrate, such as a stack of fabric layers of different sizes.

SUMMARY

The disclosure describes a stamp unit for use in a heat press, which may include pallets and a screen printing head.

The stamp unit may comprise a frame. The frame may include guide rails. For example, a first end of each of the guide rails is coupled to a first beam, and a second end of each of the guide rails, which is opposite to the first end, is coupled to a second beam. Each of the guide rails may include a beam having at least one slot.

The stamp unit may comprise carriages. Each of the carriages may be capable of sliding in a first direction along one of the guide rails. Each of the carriages may also be capable of being locked to or unlocked from the one of the guide rails. For example, each of the carriages may include a bolt or screw sized to traverse the at least one slot.

The stamp unit may comprise a support attached to all of the carriages.

The stamp unit may comprise a platen. The platen may be coupled to the support so that a horizontal position of the platen relative to the support is fixed, and a vertical position of the platen relative to the support is floating. For example, springs may apply a biasing force pushing the platen away from the support.

The stamp unit may comprise clamps for attaching the frame to the screen printing head of the heat press. The frame may be positioned at various horizontal positions relative to the screen printing head along a second direction, which is perpendicular to the first direction.

After unlocking the carriages from the guide rails, the carriages may slide in the first direction while the frame remains attached to the screen printing head. Thus, the horizontal position of the platen relative to a horizontal position of the pallets and/or the screen printing head may be adjusted.

The disclosure describes a method of using the stamp unit described herein above in a heat press.

The method may comprise the step of attaching the frame to the screen printing head of the heat press. For example, the frame may be positioned at one of various horizontal positions relative to the screen printing head along a second direction, which is perpendicular to the first direction. Then, the frame may be attached to the screen printing head using clamps.

The method may comprise the step of unlocking the carriages from guide rails included in the frame.

The method may comprise the step of sliding the carriages in the first direction along the guide rails while the frame remains attached.

The method may comprise the step of adjusting the horizontal position of the platen relative to a horizontal position of the screen printing head.

When applying a water-based ink print on a substrate, such as a stack of fabric layers of different sizes, the method may comprise the step of allowing vertical movement of the platten relative to the support while preventing horizontal movement of the platen relative to the support.

BRIEF DESCRIPTION OF THE DRAWINGS

For a more detailed description of the embodiments of the disclosure, reference will now be made to the accompanying drawings, wherein.

DETAILED DESCRIPTION

Figure 1:
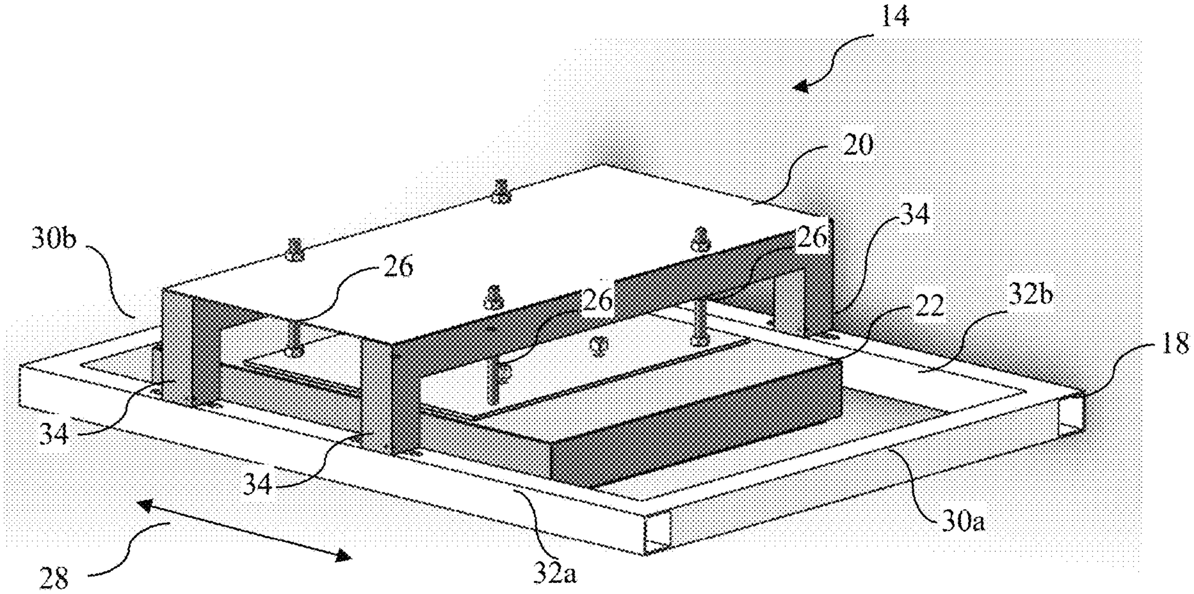
FIG. 1 is a perspective view of a stamp unit.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

In a preferred embodiment, an inline screen printing heat press is capable of flattening a print imprinted on a garment, removing moisture from the garment and the print, and supercharging and heating the pallets of the screen printing press. The inline screen printing heat press is optimized for the use of water-based inks, specifically the removal of moisture from the inks on the heat press. An example of water-based ink is high-solid acrylic ink. This acrylic ink can provide a smoother and gelled foundation for top colors and generate good-quality matte prints. However, water-based ink is just an example of use and is not required for using the inline screen printing heat press.

In use, a layer of white high-solid acrylic ink is first applied in a viscous form on a garment (e.g., the t-shirt 10 shown in FIG. 2) disposed on a pallet (e.g., the pallet 12 shown in FIG. 2) of the inline printing press. Then, the pallet and the garment are moved under a stamp unit (e.g., the stamp unit 14 shown in FIGS. 1 and 2). The stamp unit fits inside a screen printing head (e.g., the screen printing head 16 shown in FIG. 2). The screen printing head moves the stamp unit under the control of a main controller of the press in order to stamp down the garment. The controller includes a timer programmable by the operator of the press, which controls the duration of the stamping down. The heating element of the stamp unit removes moisture from the garment. The heating element removes moisture from the ink and turns the ink into a solid by gelling it. After the stamping down, the ink is dry and is no longer transferring upon contact. Then other colors can be layered on top of the dried ink.

Figure 2:
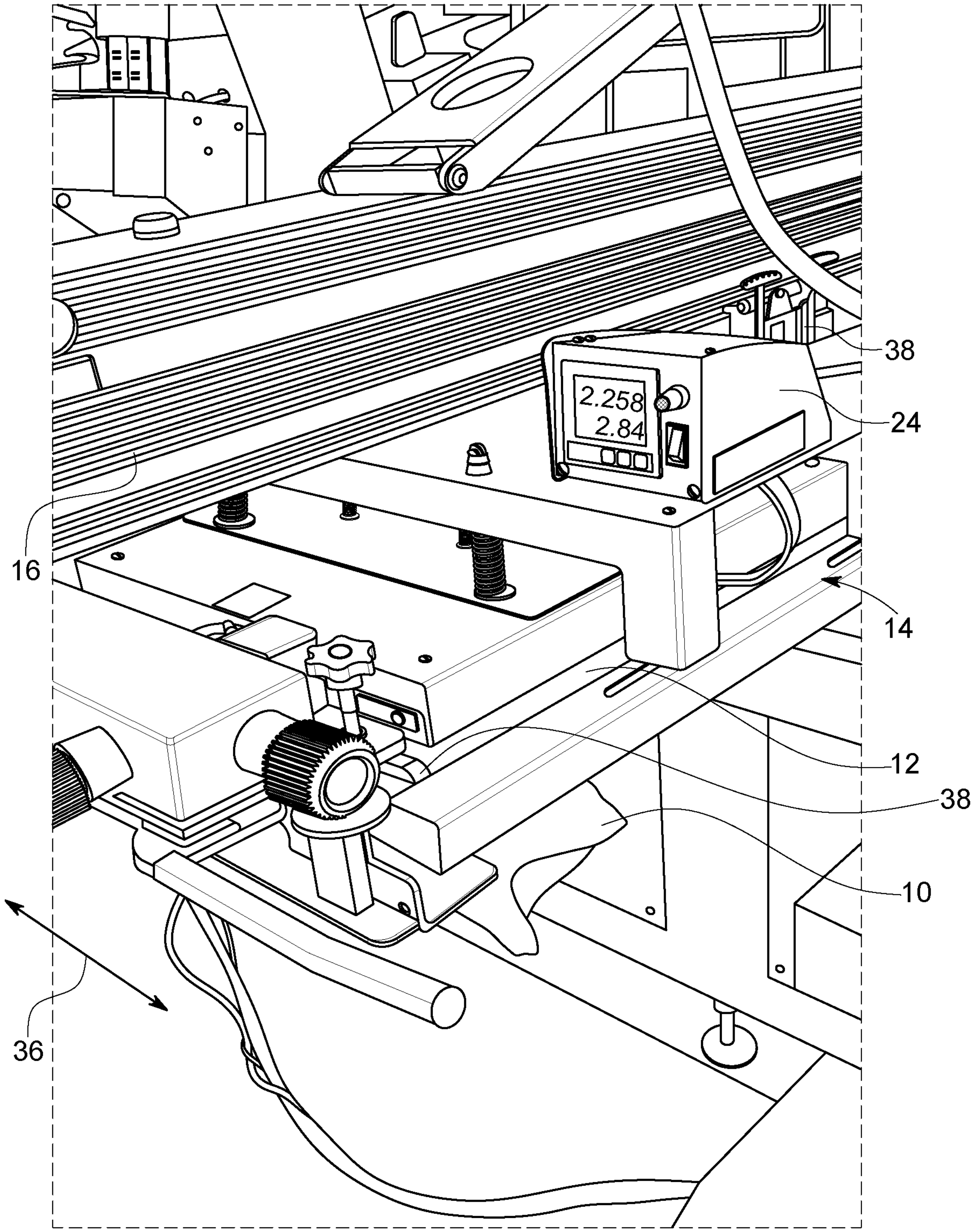
FIG. 2 is a perspective view of the stamp unit shown in FIG. 1 in use in a heat press.

The stamp unit includes a frame (e.g., the frame 18 shown in FIG. 1), a support (e.g., the support 20 shown in FIG. 1) coupled to the frame, a heating element (e.g., the heating element 22 shown in FIG. 1) coupled to the support and having a platen or ironer, and a control panel (e.g., the control panel 24 shown in FIG. 2). As the stamp unit moves against the garment, springs (e.g., the springs 26 shown in FIG. 1) can compress.

The proper centering of the springs relative to any small extra layer of fabric of the garment can lead to a more even distribution of pressure and temperature on the small extra layer of fabric. In order to center the springs relative to any small extra layer of fabric of the garment and limit the tilt of the platen or ironer that may be caused by the extra layer of fabric, a first horizontal position (e.g., the position along the front/back direction 28 shown in FIG. 1) is adjustable. In order to do so, the frame is made of first and second parallel beams (e.g., the beams 30*a* and 30*b* shown in FIG. 1) to which first and second guide rails (e.g., the guide rails 32*a* and 32*b* shown in FIG. 1) are connected. The support is connected to the frame by four carriages (e.g., the carriages 34, shown in FIG. 1). Also, in contrast with the heat press shown in U.S. Pat. No. 9,486,995, the heating element is substantially smaller than the frame.

Additionally, a second horizontal position (e.g., the position along the left/right direction 36 shown in FIG. 2) can also be adjustable. In order to do so, the first and second parallel beams can slide within and be locked with clamps (e.g., the clamps 38 shown in FIG. 2).

What is claimed is:

1. A stamp unit for use in a heat press, comprising:

a frame, the frame including guide rails;

carriages, each of the carriages being capable of sliding in a first direction along one of the guide rails and being locked to or unlocked from the one of the guide rails;

a support attached to all of the carriages; and a platen, the platen being coupled to the support so that a horizontal position of the platen relative to the support is fixed, and a vertical position of the platen relative to the support is floating, wherein springs apply a biasing force pushing the platen away from the support, wherein a horizontal position of the platen relative to a screen printing head of the heat press can be adjusted by unlocking the carriages from the guide rails and sliding the carriages in the first direction while the frame remains attached to the screen printing head.

2. The stamp unit of claim 1, wherein a first end of each of the guide rails is coupled to a first beam, and a second end of each of the guide rails, which is opposite to the first end, is coupled to a second beam.

3. The stamp unit of claim 1, wherein each of the guide rails includes a beam having at least one slot, and each of the carriages includes a bolt or screw sized to traverse the at least one slot.

4. The stamp unit of claim 1, further comprising clamps for attaching the frame to the screen printing head, whereby the frame can be positioned at various horizontal positions relative to the screen printing head along a second direction, which is perpendicular to the first direction.

5. A method of using a stamp unit in a heat press, the stamp unit including a frame, carriages, a support, and a platen, the method comprising:

attaching the frame to a screen printing head of the heat press;

unlocking the carriages from guide rails included in the frame;

sliding the carriages in a first direction along the guide rails while the frame remains attached;

adjusting horizontal position of the platen relative to the screen printing head; and allowing vertical movement of the platen relative to the support while preventing horizontal movement of the platen relative to the support, wherein springs apply a biasing force pushing the platen away from the support.

6. The method of claim 5, wherein a first end of each of the guide rails is coupled to a first beam, and a second end of each of the guide rails, which is opposite to the first end, is coupled to a second beam.

7. The method of claim 5, wherein each of the guide rails includes a beam having at least one slot, and each of the carriages includes a bolt or screw sized to traverse the at least one slot.

8. The method of claim 5, further comprising positioning the frame at one of various horizontal positions relative to the screen printing head along a second direction, which is perpendicular to the first direction, and attaching the frame to the screen printing head at the one of various horizontal positions using clamps.

9. A heat press including a stamp unit, the heat press comprising:

a screen printing head; and a stamp unit, the stamp unit including a frame, carriages, a support, and a platen, wherein the frame is attached to the screen printing head, wherein the frame includes guide rails;

wherein each of the carriages is capable of sliding in a first direction along one of the guide rails and being locked to or unlocked from the one of the guide rails;

wherein the support is attached to all of the carriages, wherein the platen is coupled to the support so that a horizontal position of the platen relative to the support is fixed, a vertical position of the platen relative to the support is floating, and springs apply a biasing force pushing the platen away from the support; and wherein a horizontal position of the platen relative to the screen printing head can be adjusted by unlocking the carriages from the guide rails and sliding the carriages in the first direction while the frame remains attached to the screen printing head.

10. The heat press of claim 9, wherein a first end of each of the guide rails is coupled to a first beam, and a second end of each of the guide rails, which is opposite to the first end, is coupled to a second beam.

11. The heat press of claim 9, wherein each of the guide rails includes a beam having at least one slot, and each of the carriages includes a bolt or screw sized to traverse the at least one slot.

12. The heat press of claim 9, further comprising clamps for attaching the frame to the screen printing head, whereby the frame can be positioned at various horizontal positions relative to the screen printing head along a second direction, which is perpendicular to the first direction.

* * * * *